(12) United States Patent
Petluru et al.

(10) Patent No.: US 11,468,449 B2
(45) Date of Patent: Oct. 11, 2022

(54) METHOD AND SYSTEM FOR DYNAMIC VISUALIZATION OF A USER JOURNEY FOR CUSTOMER SUPPORT

(71) Applicant: Conduent Business Services, LLC, Florham Park, NJ (US)

(72) Inventors: Snigdha Petluru, Bengaluru (IN); Jayati Bandyopadhyay, Bangalore (IN); Harshit Agrawal, Lucknow (IN); Nupur Labh, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 19 days.

(21) Appl. No.: 16/400,148

(22) Filed: May 1, 2019

(65) Prior Publication Data
US 2020/0349581 A1 Nov. 5, 2020

(51) Int. Cl.
| | |
|---|---|
| *G06Q 30/00* | (2012.01) |
| *G06F 3/0484* | (2022.01) |
| *G06F 3/0481* | (2022.01) |
| *G10L 15/26* | (2006.01) |
| *G06F 16/9535* | (2019.01) |
| *G06F 16/9538* | (2019.01) |
| *G10L 13/02* | (2013.01) |
| *G06F 3/0482* | (2013.01) |
| *G06F 3/04817* | (2022.01) |

(52) U.S. Cl.
CPC ......... *G06Q 30/016* (2013.01); *G06F 3/0481* (2013.01); *G06F 3/0484* (2013.01); *G06F 16/9535* (2019.01); *G06F 16/9538* (2019.01); *G10L 13/02* (2013.01); *G10L 15/26* (2013.01); *G06F 3/0482* (2013.01); *G06F 3/04817* (2013.01)

(58) Field of Classification Search
USPC ................. 715/738, 704, 705, 709
See application file for complete search history.

(56) References Cited

U.S. PATENT DOCUMENTS

| | | | |
|---|---|---|---|
| 8,250,473 B1 * | 8/2012 | Haynes | G06Q 30/0201 709/224 |
| 9,531,875 B2 | 12/2016 | Cecchi et al. | |
| 9,674,362 B2 | 6/2017 | Piaggio et al. | |
| 10,091,358 B1 | 10/2018 | Molander et al. | |

(Continued)

FOREIGN PATENT DOCUMENTS

WO   WO2018002731 A2   1/2018

OTHER PUBLICATIONS

Adi Birman-Firer, "10 Main Problems with Customer Service", https://www.nggconsult.com/10-problems-with-customer-service/.

(Continued)

*Primary Examiner* — Christopher J Fibbi
(74) *Attorney, Agent, or Firm* — Ortiz & Lopez, PLLC; Kermit D. Lopez; Luis M. Ortiz

(57) ABSTRACT

A method and system for dynamically visualizing a user experience, can involve tracking data indicative of an interaction and a journey taken by a customer and an agent, and selectively rendering a visualization of the interaction and the journey taken by the customer and the agent to aid in a faster resolution of an issue experienced by the customer. In addition, deviant states and routes can be identified within the data indicative of interactions and journeys taken by the customer and the agent.

16 Claims, 9 Drawing Sheets

(56) References Cited

U.S. PATENT DOCUMENTS

| | | | | |
|---|---|---|---|---|
| 10,296,928 | B1* | 5/2019 | Leibon | G06Q 30/0204 |
| 2003/0177017 | A1* | 9/2003 | Boyer | G06Q 30/0281 |
| | | | | 705/304 |
| 2004/0054693 | A1* | 3/2004 | Bhatnagar | G06Q 10/107 |
| 2004/0095383 | A1 | 5/2004 | Pfeifer et al. | |
| 2010/0153870 | A1 | 6/2010 | Hoffmann | |
| 2010/0205103 | A1* | 8/2010 | Patrick | H04M 3/5191 |
| | | | | 705/304 |
| 2010/0246800 | A1* | 9/2010 | Geppert | H04M 1/247 |
| | | | | 379/265.09 |
| 2013/0036062 | A1* | 2/2013 | Natarajan | G06Q 10/00 |
| | | | | 705/304 |
| 2013/0080362 | A1 | 3/2013 | Chang et al. | |
| 2014/0233719 | A1 | 8/2014 | Vymenets et al. | |
| 2015/0220970 | A1 | 8/2015 | Greenzeiger et al. | |
| 2015/0348570 | A1 | 12/2015 | Feast et al. | |
| 2016/0092883 | A1* | 3/2016 | Weber | G06Q 30/016 |
| | | | | 705/304 |
| 2016/0266752 | A1 | 9/2016 | Wu et al. | |
| 2017/0272571 | A1 | 8/2017 | Spiessback et al. | |
| 2019/0122661 | A1 | 4/2019 | Hansen et al. | |
| 2019/0236142 | A1* | 8/2019 | Balakrishnan | G06N 3/0472 |
| 2020/0098275 | A1* | 3/2020 | Doti | G09B 5/065 |

OTHER PUBLICATIONS

"12 Major Challenges Faced by the Call Center Industry," Flat World Solutions.

Scott Kendrick, "11 Call Center Best Practices You Need to Be Doing Right Now", Jan. 26, 2016, https://callminer.com/blog/4-callcenter-best-practices-you-need-to-be-doing-rightnow/.

"Customer Anger Causes Emotional Injuries to Service Reps", Posted Dec. 9, 2013, Psychology Today.

"What Problems Customer Service Agents Face on a Day to Day Basis", Jun. 7, 2018.

* cited by examiner

METHOD AND SYSTEM FOR DYNAMIC VISUALIZATION OF A USER JOURNEY FOR CUSTOMER SUPPORT

TECHNICAL FIELD

Embodiments are related to the visualization of information through interactive graphical user interfaces. Embodiments further relate to the field of call centers and technologies for improving efficiencies in call center operations and customer service.

BACKGROUND

A call center can function as a centralized virtual and/or physical location to handle communications with customers. When a customer has a problem or question for a company or other organization, the customer may contact the call center and communicate with an employee of the call center who can assist the customer with his or her problem or question. Employees of the call center may have various roles, such as agents, supervisors, and directors. An agent of the call center typically provides the first level of interaction with a customer. Agents often follow scripts or may be trained in a specific set of rules. Supervisors monitor and evaluate the agents. The call center manager or director manages the end-to-end operations of the call center.

Customers contact the call center through communication channels, such as phone, chat, and other channels. At the call center side, various devices can control the communication channels to agents. The devices can manage the routing and connection of the employees of the call center to customers.

To keep up with increasing channels of communication, companies and other organizations invest a significant amount of time and resources in supporting a more unified customer experience through call centers and other communications platforms. This can extend to customer care support operations as well, which have demonstrated effectiveness across a wide gamut of interaction modes. While conventional modes such as face-to-face, email, FAQ's, and voice calls have been well established, newer forms (e.g., virtual chatbots and intelligent voice agents) may serve two purposes. First, these new forms of communications allow a customer to be engaged with information that is searchable in databases, and 2) these new forms of communications can aid human agents by reducing their workload and allowing them to focus on calls that are more challenging.

Each channel of service may possess its own fair share of constraints. Face-to-face resolutions may be preceded by long waiting times and mobility challenges. Email is traditionally asynchronous, which can lead to more back-and-forth and longer waiting times for resolution. FAQs may not be exhaustive, and a customer's problem may often escape the realm of issues covered on a website or booklet. Chats may be laden with resource allocation challenges, as do voice calls.

Hybrid channels comprising intelligent agents as a precursor to human agents can address resource constraints, but with a tradeoff in accuracy. This has been considered an acceptable tradeoff by organizations. Customers, however, often prefer interacting with humans instead of "intelligent" agents, often finding different ways to bypass the agent. A problem with this "intelligent" agent approach, however, lies in the inability to track their progress as they engage in the customer service process, leading to anxiety and frustration on the part of the customer. The flipside to this problem lies in the inability of a human agent to track the customers' interaction with the "intelligent" agent.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for managing customer journeys comprising a series of interactions between a customer and another party such as a company, in order to improve the efficiency and quality of the interactions, or the series of interactions which is known as a "journey".

It is another aspect of the disclosed embodiments to provide for methods and systems for dynamically visualizing a user experience.

It is further aspect of the disclosed embodiments to provide for a visualization method and system that provides a customer and an agent with a comprehensive view of their interactions and journey to aid in a faster resolution of an issue experienced by the customer.

The aforementioned aspects and other objectives and advantages can now be achieved as described herein. In an embodiment, a method for dynamically visualizing a user experience, can involve tracking data indicative of an interaction and a journey taken by a customer and an agent, and selectively rendering a visualization of the interaction and the journey taken by the customer and the agent to aid in a faster resolution of an issue experienced by the customer.

In an embodiment, the method can further involve identifying deviant states and routes within the data indicative of interactions and journeys taken by the customer and the agent.

In an embodiment, the method can further involve granularizing the data indicative of the interactions taken by the customer and the agent to provide historical and real-time insights from the data, which are then selectively rendered for at least one of the customer, the agent and a manager of the agent as a part of the visualization.

In an embodiment, the method can further involve the data indicative of the interactions taken by the customer and the agent to identify deviant states and routes from the data, which are then selectively rendered for at least one of the agent and a manager of the agent as a part of the visualization.

In an embodiment, the method can further involve personalizing the visualization based on a user role.

In an embodiment, the method can further involve personalizing the visualization based on a type of device by which the visualization is rendered.

In an embodiment, the method can further involve personalizing the visualization based on a type of display in which the visualization is rendered.

In an embodiment, the can further involve providing an interactivity feature that facilitates searching and filtering of the data indicative of the interaction and the journey taken by the customer and the agent, and displaying the visualization based on results of the searching and the filtering of the data.

In an embodiment, a system for dynamically visualizing a user experience can include at least one processor and a memory, the memory storing instructions to cause the at least one processor to perform: tracking data indicative of an interaction and a journey taken by a customer and an agent, and selectively rendering a visualization of the interaction and the journey taken by the customer and the agent to aid in a faster resolution of an issue experienced by the customer.

In an embodiment, the instructions can be further configured for identifying deviant states and routes within the data indicative of interactions and journeys taken by the customer and the agent.

In an embodiment, the instructions can be further configured for granularizing the data indicative of the interactions taken by the customer and the agent to provide historical and real-time insights from the data, which are then selectively rendered for at least one of the customer, the agent, and a manager of the agent as a part of the visualization.

In an embodiment, the instructions can be further configured for granularizing the data indicative of the interactions taken by the customer and the agent to identify deviant states and routes from the data, which are then selectively rendered for at least one of the agent and a manager of the agent as a part of the visualization.

In an embodiment, the instructions can be further configured for personalizing the visualization based on a user role.

In an embodiment, the instructions can be further configured for personalizing the visualization based on a type of device by which the visualization is rendered.

In an embodiment, the instructions can be further configured for personalizing the visualization based on a type of display in which the visualization is rendered.

In an embodiment, the instructions can be further configured for providing an interactivity feature that facilitates searching and filtering of the data indicative of the interaction and the journey taken by the customer and the agent, and displaying the visualization based on results of the searching and the filtering of the data.

In an embodiment, a visualization system, can include a visualization framework that tracks data indicative of an interaction and a journey taken by a customer and an agent, and selectively renders a visualization of the interaction and the journey taken by the customer and the agent to aid in a faster resolution of an issue experienced by the customer, a prediction engine that communicates bidirectionally with the visualization framework and which allows at least one of the customer and the agent to view predictions including at least one potential route based on the data indicative of the interaction and the journey taken by the customer and the agent, wherein the predictions generated by the prediction engine are rendered as visual elements by the visualization framework.

In an embodiment, the system can further include a NLP (Natural Language Processing) engine that communicates bidirectionally with the visualization framework and which is utilized by multiple channels to interpret an inquiry by the customer, wherein content generated by the NLP engine is displayed in whole or as an abstraction by the visualization, a ASR (Automatic Speech Recognition) engine that communicates bidirectionally with the visualization framework and which translates vocal utterances into a text format during the interactions comprising voice-based interactions and which provides contextual information as well as status updates reflected as visual elements within the journey, and a TTS (Text-to-Speech) engine that communicates bidirectionally with the visualization framework and which retrieves information from the data indicative of the interaction and the journey that is converted into vocal utterances for presentation to a user for narrowing down a service focus or dissemination to the customer with a goal of resolving the issue experienced by the customer.

In an embodiment, the system can include a ticketing system that communicates bidirectionally with the visualization framework and which functions as a central pipeline for the customer and channels of interaction with the customer and which triggers the visualization framework based on a request for a service through at least one of the channels of interaction with the customer.

In an embodiment, the system can include a help database that communicates bidirectionally with the visualization framework and which contains a set of resolution protocols and instructions that are defined for a service request, wherein the help database servers as a central repository of lookup for the visualization framework to access and retrieve to assist the visualization framework in access and visualization all possible routes in the journey based on a type of the service request.

In an embodiment, the system can include a user database that communicates bidirectionally with the visualization framework and which includes customer and agent information that facilitates personalizing and contextualizing the visualization rendered.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
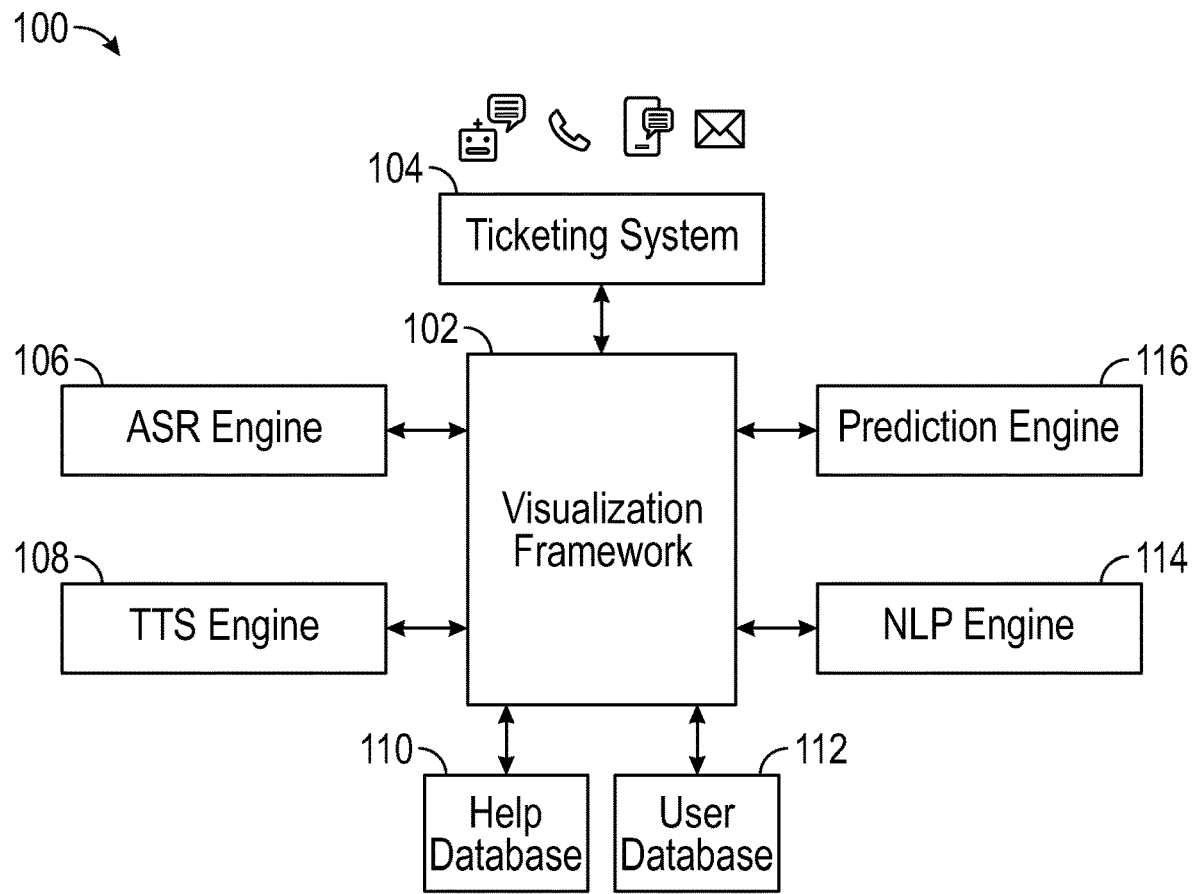
FIG. 1 illustrates a block diagram of a visualization system, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

When a customer calls an organization's or company's customer support service, the customer may become frustrated due to his or her unresolved issues with the organization or company. A customer may face a number of issues during a customer support call, which may make them angry and irritated. An example of this type of situation may involve a scenario in which a customer is placed on hold during a customer support call without being informed of the reason for being placed on hold and/or what is happening on the other end of the call. In some situations, a customer may be placed on hold for a long period of time without the agent (e.g., a call center agent, customer support agent, etc) informing the customer when the agent will return. Other issues that a customer may face include the transfer of the call from one department to another and the customer again having to explain the issue to the next agent. The time taken to resolve the customer's issue is another reason the customer may become angry during a call with a customer support agent. Although there may be any of a number of reasons for time taken in this manner during a customer support call, the customer does not knowing the reason, which in turn may increase his or her frustration.

In many customer support situations, a customer may require certain information that is not available to the customer during a call with the agent. Not having the information at hand can delay the time of resolution, hence, increasing the frustration of the customer. At times just to resolve the issue at hand, an agent may in haste provide incorrect information to the customer, which leads to even more anger and frustration on the part of the customer. Making the customer aware of their journey or enabling them to visualize their "journey" would be very helpful for the customer as well as the agent. Call center agents are typically entry-level employees who "go on the floor" with about a month's training. A customer, however, can see a call center agent, as a representative of the company. Thus, a customer may hold the agent responsible for any problems encountered by the customer.

Note the term "journey" as utilized herein can relate to a customer journey, which may be a series of interactions between a customer and another party, for example a company or organization and/or the agents of the company or the organization.

Customer service employees often average up to 10 hostile calls a day and must tolerate personal insults, screaming, cursing and even threats—regularly. They may be required to stay on the line and 'salvage' even the most hostile calls. Call center representatives thus face a great deal of pressure to resolve the call on time and to find a solution to customer's problems. Issues also arise when a call is transferred to a call center agent from another agent without giving them the history of the problem, which may force the new agent to ask the agitated customer again to describe the problem, which is not a good practice in a call center situation.

Along similar lines, when the customer is not able to explain his or issue correctly, the agent faces the issue of understanding the problem and taking even more time to resolve the issue, which may lead to performance consequences on the part of the agent. Agents are already working under an enormous amount pressure to resolve the issue that a customer may be facing. An agent may experience a cognitive overload when he or she has to toggle between various windows and applications to find information while simultaneously speaking with a customers. Adapting to the latest technology is always a challenge, and an agent must figure out not just how a new technology works, but how it works best, so that he or she can increase his or her productivity.

Call center agents are typically trained under a stringent call center matrix that they have to follow. Agents may be given guidelines to handle calls in a manner from which they cannot deviate as doing so may lead to an escalation. Agents are trained to be polite and professional during their phone conversations with customers. If an agent is unable to resolve the issue on the call, the agent typically promises a call back to the customer or may escalate their issue to the higher level.

In some cases, call monitoring and scoring may be implemented for random calls by a quality assessment team as a way to ensure that an agent is following the guidelines. Keeping track of call metrics and agent KPIs is a good technique of maintaining a high level of performance in the call center. For resolving the issue that a customer may be facing, an agent generally needs knowledge of the precise problem the customer is facing, along with information indicating whether the problem is a new issue or an old issue.

If the customer's problem is an old issue, the history of the problem, what has been accomplished to date, and how the problem has to be taken forward, is information that would be very helpful to the call center agent. If the customer's problem is a new issue, further in the call an agent can request additional details from the customer related to their issue (e.g., if the problem is a transaction related issue, the agent may require the customer's card number or account details). At times, an agent may misunderstand the issue at hand or the customer may note be able to explain the issue in detail for the agent to adequately understand. In addition, the information provided by an agent may be different from what the customer requires. If the whole of the "journey," however, is shown to both the customer and the agent in a visual form, both the customer and agent may have a better understanding of the problem. Having prior information about what details would be required during an interaction would make the job easier for both the agent and the customer.

FIG. 1 illustrates a block diagram of a visualization system 100, which can be implemented in accordance with an embodiment. The visualization system 100 shown in FIG. 1 can include a number of components, which can communicate with a visualization framework 102. The visualization system 100 can include the visualization framework 102. A ticketing system 104 can communicate bidirectionally with the visualization framework, and can serve as a central pipeline for identifying customers and their corresponding channels of interaction. When a customer proceeds to request for a service through one of these mediums (e.g., Chabot, voice, email, or live chat), the customer's actions can be logged in the ticketing system 104 and the device used for supporting this service can be triggered by the ticketing system 104 to activate the visualization framework 100.

An ASR (Automatic Speech Recognition) engine 106 can also communicate bidirectionally with the visualization framework 102. The ASR engine 106 can be configured to translate vocal utterances into text during voice-based interactions. The ASR engine 106 can also be configured to extract acoustic data from human speech, and compare and contrast the acoustic data to stored subword data, select an appropriate subword which can be concatenated with other selected subwords, and output the concatenated subwords or words for post-processing such as dictation or transcription, storing to memory, training ASR models or adaptation parameters, or the like.

The ASR engine 106 can serve two key goals. First, the ASR engine 106 can support the creation of a detailed log of what transpired on the call. Second, the ASR engine 106 can search for key phrases or utterances to trigger corresponding modules that address a customer's need, in case of "intelligent" agents. In addition, the ASR engine 106 can tie in with the visualization framework 102 to provide contextual information as well as status updates that can be reflected as visual elements within the journey.

A TTS (Text-to-Speech) engine 108 can be configured to retrieve information that is converted into vocal utterances that are presented to the user. This information could either be presented as options for further narrowing down of service focus or can be disseminated to the customers with the goal of resolving the concern. This generated information can be mapped to the visualization framework 102 to represent the change in the journey or the status of the service request. The TTS engine 108 can communicate bidirectionally with the visualization framework 102.

A Help database 110 communicates bidirectionally with the visualization framework 102 and can be configured to contain a comprehensive set of resolution protocols and steps that can be defined for service requests. The Help database 110 can serve as a central repository of lookup for the visualization framework 102 to access and retrieve. These arrangements can assist the visualization framework 102 with accessing and visualizing all possible routes in a journey given the type of service request. Furthermore, the Help database 110 can assist in validating a customer's journey through these steps, while enabling an agent to foresee any constraints and dependencies along the journey, which may be rendered as visual elements.

A user database 112 can also communicate bidirectionally with the visualization framework 102 and can be configured to maintain customer and agent information that helps personalize and contextualize the rendered visual journey. Information about the customer can include, for example, the customer's product or service information, in addition to previous interactions with customer support. Agent information can include their domains of expertise, their successful and unsuccessful resolutions, as well as detailed records of the customers they have provided a service to, including time for resolution, holds and transfers.

An NLP (Natural Language Processing) engine 114 can communicate bidirectionally with the visualization framework 102 and can be utilized by multiple channels to interpret a customer's inquiry. In the case of the chat feature, the NLP engine 114 can identify the customer's concerns to then generate appropriate responses. In the case of calls, the NLP engine 114 can identify and trigger an appropriate intent based on the content of the request. The NLP engine 114 can also be configured to generate the textual responses that are rendered to speech by the TTS engine 18. The agent can also be showcased additional information about the customer's mood based on the interpretation of sentiment from text. The content generated by the NLP engine 114 can be either displayed in whole or as an abstraction by the visualization framework 102. Note that NLP relates to a field of computer science, artificial intelligence, and linguistics concerned with the interactions between computers and human (natural) languages.

A prediction engine 116 can also communicate bidirectionally with the visualization framework 102 and can be configured to allow customers and clients to see potential and more probable routes. The predication engine can also be configured to estimate, based on historical transactions, the expected time for a resolution along each state, route, and journey. In addition, the prediction engine 116 can be configured to retrieve dependencies for each state and accounts for these dependencies in its estimations. The prediction engine 116 can be further configured to generate the route milestones by interfacing with the help database 110, while identifying potential states where deviations can occur. These predictions can be rendered as visual elements within the visualization framework 102.

The visualization framework 102, which can also be referred to as a ViserAct Framework in some embodiments, can be configured to render dynamic visualizations about customer journeys to make users more aware of the various stages in these journeys and time for resolving their service requests. The visualization framework 102 can provide for a more transparent mechanism to view an entire system and can support role-based (e.g., customer, support agent, manager, etc.) and view-based (e.g., mobile, desktop, etc.) personalization to depict an end-to-end journey in real time. In addition, the visualization framework can be configured to allow users to view historical journeys, thereby helping the users maintain a comprehensive record of all interactions for improved decision making while encouraging providence during journeys.

The visualization system 100 can thus be implemented to provide customers and agents with a comprehensive view of their interactions and journeys. The visualization system 100 can provide both historical and real-time insights and accounts for the ability of customers to engage in interactions through a diverse set of platforms. The visualization system 100 can also identify deviant states and routes, visualizing them effectively to aid in faster resolution. The visualizations provide by the visualization system 100 can be supported and personalized for different user roles and device of display. In addition, the visualization system 100 can provide interactivity features that facilitate search and filter capabilities. In doing so, the visualization system 100 can provide a transparent view of the service architecture and increase a user's awareness of its functionality.

Customer service interactions can involve two primary actors—the customer, and the service agent. In addition, we can account for a secondary actor—the service manager. Each of these actors can interact with the visualization system 100 with a distinguished set of goals and objectives. While there may be common alignment in certain goals, the relative priority of the goal can vary among these actors. Distinct views with visualization priorities can be delineated for each actor, as discussed below.

The first form of visualization, which an be provided is the Customer View (i.e., customer visualization). A customer can activate the visualization system 100 in one of three ways:

1) Begin a new request—When the customer experiences an issue or has a query that may need a resolution, the customer can initiate an interaction with customer service. This can occur through any of the channels that reach the ticketing system 104.

2) Continue from an existing open request—The user can view a record of all past requests and view the contextualized steps given their historic interactions.

3) Reopen a closed request—The user can also choose to pursue a request that has already been closed by reopening it, in which case he can be provided with a customized resolution journey given his or her chosen reason for reopening the request.

When a user begins a new request either through his or mobile application or through a website, the visualization framework 102 can render a dynamic visualization "on screen", which can be continually updated as the user progresses through the choices provided to the user. The visualization can also gather predictive information about route paths to show the user potential routes and any constraints and dependencies along these routes. The user can also be provided with a choice of selecting a state to advance to, and this choice can be automatically reflected on their channel. The customer can also view increasingly more information about the current state or past states along their journey. In addition to this, the customer can view the ETR (Estimated Time for Resolution), completion of the entire journey, the current state, and the potential routes from that state. The customer can also be provided with an option to navigate back to a previous state with a simple tap or click via a GUI. In addition, the customer can be shown the approximate hold time and agent information when a call is being handed off. This request-focused view can be referred to as the customer's local view.

In the context of previous requests, the user can view a historic overview of all their previous requests in their global view and can choose to delve deeper into each request's journey. This journey can provide contextual cues about each stage, especially those that involve a channel of communication with an agent, which can be provided on demand. The user can obtain details about specific agents that they had conversed with and the potential solutions that were recommended. The user can also be provided an option to continue the request by choosing a particular mode for conversation. In this case, given his or her historic interactions, steps can be personalized so that he or she can skip past the entire journey to resume from his or her most recent state. For the reopening of closed requests, the user can also be provided with options via the GUI to narrow down his or her reasons by selecting from a historically approved list or can choose to provide a distinct reason. Depending on this selection, a customized journey can be determined in addition to identifying the appropriate agents that may need to be involved in this journey. In this manner, the GUI improves a user's navigation (e.g., speed, efficiency) through various views, windows, and other GUI components and features as discussed herein.

The second form of visualization, which may be implemented according to the disclosed embodiments, is the Agent View (i.e., agent visualization). An agent can activate the visualization system 100 for two primary purposes. First, the visualization system 100 can be activated or invoked by the agent to view a specific user's journey. For example, while connecting to a customer, the agent can view historical and current journeys of the specific user. Second, the agent can activate or invoke the visualization system 100 to monitor the journey for larger groups of users. For example, the agent can also monitor various points across their domain of expertise mapped as a larger journey map. In doing so, the agent can view the progress of multiple users and potential hurdles across all states under their purview.

When an agent receives a notification regarding an assigned customer, that customer's current journey can be automatically populated and visualized by the visualization framework 100 in the agent's local view. In addition to providing a detailed context about the customer, the time spent on various states and subsequent results of their interaction with that state can be showcased to the agent via a GUI. In addition, the user's explored visual elements can be showcased through the GUI as context to enable the agent to attain insights about the kind of query the user may possibly have. Note that in one embodiment, the disclosed GUI can be implemented through a series of windows, pages, or the like that can be launched or invoked by the selection of a GUI button or another element in a displayed page. Each window, page, or the like of the GUI can comprise one or more GUI elements and/or controls.

If the call has been handed off, the new agent can also view the previous agent's notes about the need for redirection to this agent. With all context accessible on demand, the agent can support the customer in a faster resolution of the customer's query. In addition to various states along the customer's journey, the agent can also view information indicating if the customer was stuck in a deviant state at any point of time, where users historically spend more time determining the right path for resolution.

An agent can also be provided with an option via the GUI to view a global view of various customers journeying through the agent's domain of expertise. In such a case, the agent may find paths related to a specific individual or group of individuals. In addition, across the overall displayed map, the agents can view an aggregate count of customers at each state in addition to the time taken for journey completion. Agents can also view in the GUI, various deviant states and paths that may be formed as a result of these states. Agents can also search a database for customer records with similar journeys and potential solutions from previous cases by using an array filter and search tools, thereby making a vast set of records easily accessible and comprehensible for improved decision-making.

A third form of visualization is the Manager View (i.e., manager visualization). A manager may activate the visualization system 100 either to monitor the network and the agents or to interact with a customer whose request has been escalated. A manager's global view can include various sets of domains and agents who fall under the manager's purview. The journeys that agents are responsible for can be visualized with toggled views for a customer-centric visualization versus an agent-centric visualization. The manager can choose to filter or search for a more refined view and obtain prioritized findings about the states that have the most deviations, and journeys that are the most time-consuming. In case a specific customer's case is directed towards the manager, then that customer's historic interactions along with their current journey is automatically retrieved and showcased in the manager's local view by the framework. In addition, the customer's moods or sentiments can be also captured and showcased so that the manager can examine the best strategies to retain the customer's interest in the product or service.

Figure 2:
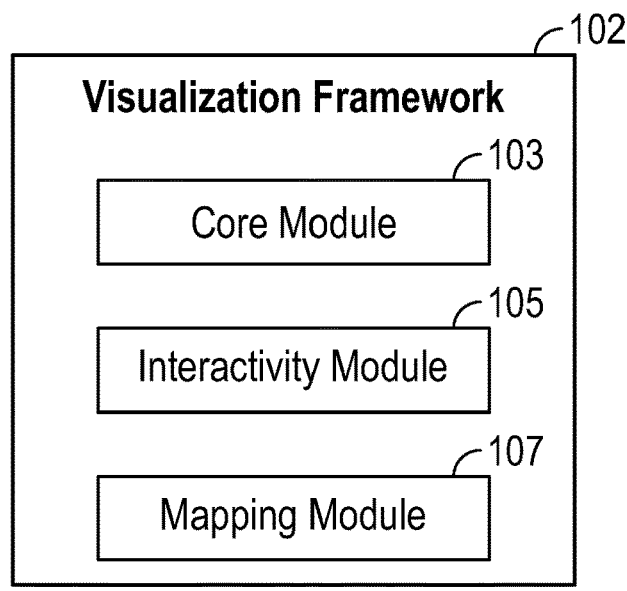
FIG. 2 illustrates a block diagram of the visualization framework of the visualization system, in accordance with an embodiment.

FIG. 2 illustrates a block diagram of the visualization framework 102 of the visualization system 100, in accordance with an example embodiment. The visualization framework 102 can be configured as a module or a group of modules including a core module 103, an interactivity module 105, and a mapping module 108 that can facilitate the effective rendering of journeys.

The core module 103 can provide various visual elements that can form the focus of the journey. The interactivity module 105 can provide auxiliary visual elements and interactions such as filter, expand, abstract, and search, which can help various users personalize and focus on their points of interest. The mapping module 107 can be utilized to identify various contextual visual elements and associate them with their counterpart visual elements in the visual journeys that are rendered.

Figure 3:
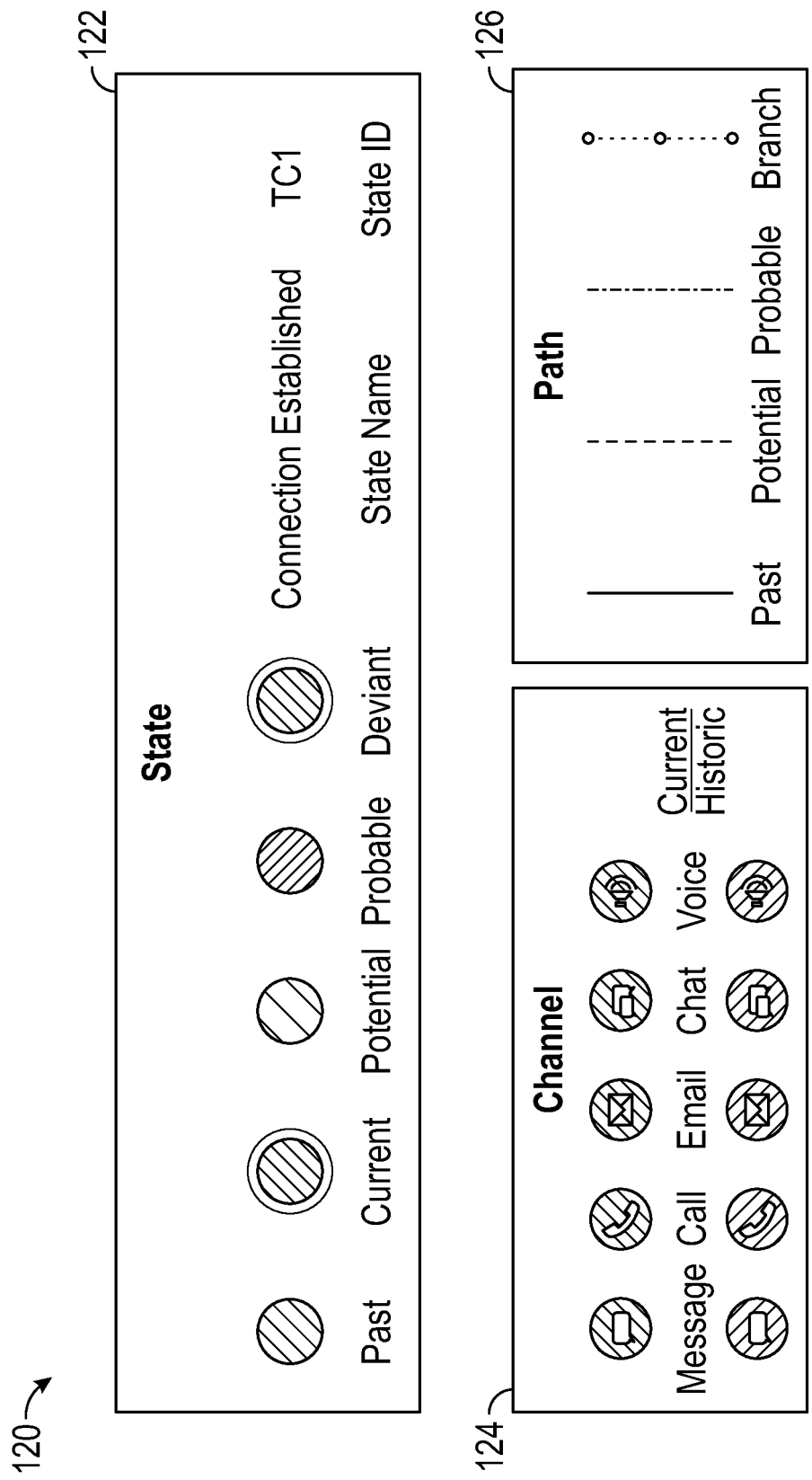
FIG. 3 illustrates a GUI (Graphical User Interface) that displays graphical icons representing state elements, channel elements and path elements that when selected by a user, can provide granularized information and interactions regarding a journey taken by the user, in accordance with an embodiment.

FIG. 3 illustrates a GUI 120 that displays graphical icons representing state elements, channel elements and path elements that when selected by a user, can provide granularized information and interactions regarding a journey taken by the user, in accordance with an embodiment. The state element icons are displayed in a GUI section 122 labeled as "State", and the channel element icons are displayed in a GUI section 124 labeled as "Channel". The path element icons are displayed in a GUI section 126 labeled as "Path".

The core module 103 can focus the core elements within the visualization system 100 that are associated with representing the journey. Examples of such core elements are the GUI elements shown in FIG. 3, which when selected cause a particular action such as the display of particular state data, channel information and path information or associated interactions.

A group of primary channels or modes for a customer's interaction and a resolution of queries can be provided by the core module 103. These primary channels or modes can include Message, Email, Chat, Voice and Call, which are represented by the channel elements shown in the GUI section 124. Message can involve conversations that can occur in-person or as notifications in a synchronous form. This feature can be represented graphically in a GUI by an orange circle with a speech bubble.

Email can involve an asynchronous form of communication, wherein the prioritization of information occurs. The Email channel or mode can be visualized graphically in a GUI as an envelope. Chat is somewhat similar to the Message feature, however, the Chat feature can offer more prompt conversation and can be facilitated with a bot (e.g. a so-called chatbot) or an actual agent, captured as log data. The Chat feature can be visualized in a GUI as a two-way chat window. Voice involves voice-based interactions that can occur through an IVR (Interactive Voice Response) or a digital voice agent within the application. Note that the term bot as utilized herein can relate to a software application that runs automated tasks (e.g., scripts) over the Internet. Note that the term chatbot as utilized herein can refer to a computer program designed to simulate conversation with human users, especially over the Internet.

The Voice feature can be visualized graphically in a GUI as a speaker emitting noise. Call can be provided as an additional form of a voice-based interaction that could lead to conversation with a human voice agent in addition to an IVR or digital agent. The Call feature can be visualized as a phone icon. Note that the term IVR as utilized herein can relate to an automated telephony system that interacts with callers, gathers information and routes calls to the appropriate recipients.

Each event within this journey can be termed a state. Each state can include a unique identifier that can be referred to in addition to a description and name associated with that state. A state can be represented graphically in a GUI by a circle, and can be one of four types (e.g., see the GUI section 122 labeled "State" in FIG. 3):

Past State—The customer has already accessed this event along their journey. The Past State can be represented graphically in a circle by a colored circle.

Current State—The customer is currently in this state or is currently experiencing this event. The Current State can be represented graphically in a GUI by a circle, which has an increased diameter and may also be displayed in color. This Current State feature can allow a customer to obtain his or her current position in the journey.

Potential State—At any given state, there could be multiple routes that can be selected. The state associated with such a route can be indicated as a potential state and can be represented by colored rounded rectangle.

Probable State—The Probable State can be the event that is predicted to occur with a higher level of confidence in comparison to other potential states along the customer's journey. The Probable State can be represented graphically in a GUI by a translucent, grey circle and can be showcased only to the agent and manager.

Examples of the aforementioned states are shown in the GUI section 122. For example, a user may select the GUI element labeled "probable", which when selected will provide information regarding the probable state as discussed above.

The transition from a given state to one of its adjacent states can be termed as a path. A linear chain of paths from a given state to a non-adjacent state can be termed a route. While a path cab represent the link between two states, a route can more than two states. Examples of "Paths" that may be selected are shown in the GUI section 126 of FIG. 3.

Paths can be of the following types:

Past Path—The path associated with states that have already been traversed by the customer. The Past Path can be represented graphically in a GUI by a solid black line connecting the states.

Potential Path—The path associated with any potential state. The Potential Path can be represented graphically in a GUI by a dashed light grey line connecting the current and potential states.

Probable Path—Out of all potential paths, the most probable path is one associated with the state that has been predicted with a higher level of confidence. The Probable Path can be represented graphically in a GUI by a thick, dashed dark grey line and may be showcased only to the agent and manager in some embodiments.

Figure 4:
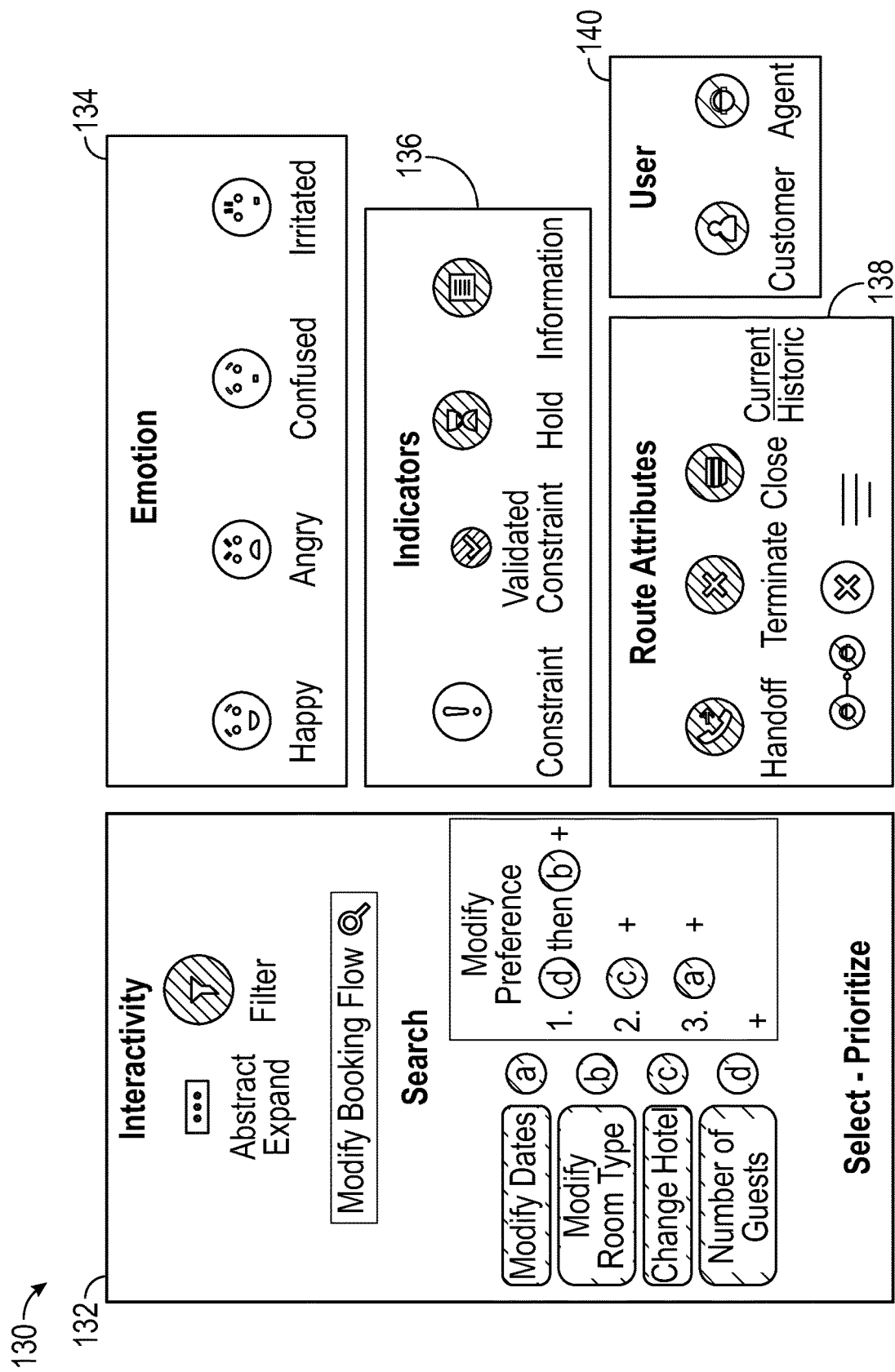
FIG. 4 illustrates a GUI that displays graphical icons representing interactive elements, emotion elements, indicators, route attributes and user, that when selected by a user, can provide granularized information and interactions regarding a journey taken by the user, in accordance with an embodiment.

FIG. 4 illustrates a GUI (Graphical User Interface) that displays graphical icons representing interactive elements, emotion elements, indicators, route attributes and user, that when selected by a user, can provide granularized information and interactions regarding a journey taken by the user, in accordance with an embodiment. The interactivity module 105 discussed previously with respect to FIG. 2 can provide instructions for displaying and facilitating the interactivity features shown in the GUI section 132 in FIG. 4. That is, GUI section 132 is labeled "Interactivity" and can be configured to implement features provided by the interactivity module 105.

The GUI section 134 labeled as "Emotion" can display graphical icons that a user may select to indicate a particular mood such as "happy", "angry", "confused", or "irritated". The GUI section 136 labeled "Indicators" can be configured to display graphical icons that when selected by a user can provide for a particular course of action, such as "constraint", "validated constraint", "hold", and information, as will be discussed in greater detail below. The GUI section 138 can be configured to display graphical icons that when selected by a user can trigger a particular course of action such as "handoff", "terminate", "close", and so on. The GUI section 140 can be configured to display graphical icons that when selected by a user can trigger a particular course of action such as activities for the "customer" or the "agent".

If a conversation is placed on a wait line, a hold icon can be rendered, which can be graphically represented in a GUI by an hourglass within the state's visual element if the wait is current, or can be graphically represented in the GUI as an adjacent icon in case of previous or potential states. An example hold icon is shown in the GUI section 136 in FIG. 4.

While on hold, if activities beyond the control of the customer continue to occur, these states can be graphically represented in the GUI on a parallel line that branches from after the graphically displayed hold icon. In such cases, the states can be represented in circles of smaller diameter to address the states during a hold. If one chooses to go back to a different state, then their current state may lead to a null state, which can be graphically represented by a close symbol. In such cases, a fresh path can be created from the prior state to the null state. A handoff can refer to the transmission of the call from one agent to another and can be visualized as a dashed line with an arrow towards the next predicted route. During such handoffs to agents, both the past and upcoming agent information can be available on demand, by tapping on or hovering over the agent id that may be displayed.

When multiple bundled tasks may need accomplishment, there may also be a need to prioritize visual routes effectively. This feature can be supported by the GUI, wherein a user can prioritize and bundle a group of tasks that may need to be accomplished such that once the first task within the request has been successfully completed, they are automatically redirected to the route or state that initiates their incomplete tasks. When an individual explores a route completely and decides to change their journey by backtracking to a given point, then their explored route can close, and can be represented graphically in a GUI by the appending of a grounded symbol. If an unsuccessful traversal occurs and the user may need to backtrack, their route can then terminate. This feature can be represented graphically in a GUI as a cross icon.

In order to display potential challenges, authentications, and dependencies related to the state, known as constraints, we can use the representation hazard icon within a circular outline. A constraint can be related or restricted to a particular state, a path during state change, or related to the discussion centered on the current journey. Alternatively, the term constraints or constraint can also refer to directions or dependencies that can uniquely relate to role-specific views. A constraint that has been satisfied can be appended with icon with a tick and can be referred to as a validated constraint.

In addition to showing users contextual information about journeys, it is also important to provide them with a temporal understanding and foresight of their historic and current journey so they may be able to better anticipate the constraints and time spent. In this context, we can predict and visualize these temporal attributes:

request creation time—the exact date and time stamp associated with the creation of a new request by the customer;

elapsed customer time—the time spent by the customer on their current journey up until their current state;

elapsed agent time—the time spent by the agent in catering to the customer across a group of states;

estimated resolution time (ETR)—the approximate time left on the journey along the probable path;

state begin time—the exact date and time stamp associated with the customer's entry into a given state;

elapsed state time—the time spent by the customer in a given state; and estimated state time—the predicted time left for the customer in a given state.

The agent can view a set of additional visual and contextual elements that can relate to either a specific customer or a larger group of customers. With respect to an individual customer, their customer id is displayed with details-on-demand of their previous requests and system-detected challenges. The emotion or mood of the customer is also identified and dynamically updated using uniquely designed symbols for: happiness, anger, confusion, and frustration.

In both the local and global views, the agent can see any state that has historically seen multi-branch exploration by the customer to determine the route appropriate for them. Such a state is called a deviant state, wherein if users pass this state only to return to it and make an alternate selection repeatedly, then we can highlight this state to agents by changing the color of the circular state icon to red. The intensity or impact of the deviation can be encoded within the size of the red circle, where more intense states are larger in size.

Given a root deviant state, subsequent states that experience deviated path exploration can be linked to a ripple effect that has been initiated because of the root deviant state. Such a pattern is termed as a deviant route and is highlighted by a gray shadow originating from the root deviant state, covering the states and paths impacted by the root. In the agent's global view, the visualization framework 102, which can be extended to the deviant states as well as deviant routes, can visualize the number of customers at any given state. When deviant states exist in a customer journey, they can be visualized in the customer's view. Additionally, the estimated time of resolution can be showcased for each potential state to help a customer make informed decisions.

In addition to the visual elements available to agents, the manager can view additional attributes that can provide a more aggregated view of the network. The manager can view the number of drop-offs at any given state or path, indicated by a grey customer icon that is diagonally struck out, followed by a numeric reference. Additionally, they can view each agent's domain of expertise, encoded as a line of text, and view agent location—the states across a global journey map where agents are currently aiding customers, visualized by a dynamically changing icon of a user with a headset, supported by the agent ID displayed beside each icon.

The interactivity module 105 can be configured to focus on the auxiliary elements and interactions within the visualization framework 102 that may be associated with providing more personalized views to the users. The interactivity module can be composed of five key components that can address different need-finding goals of the users as follows:

Abstract—providing a broader view of a set of states that are not of temporally contextual relevance.

Expand—providing details-on-demand about a certain journey, or different visual elements encoded within a journey.

Filter—supporting a role-based global view that can support the visualization of the network that contains journeys that can be attributed to the desired selection criteria.

Search—supporting global and individualized information retrieval through locating unique identifiers or general contextual keywords.

Select—enabling interactivity with various visual elements in both global and local views across stakeholders.

The Abstract component's role in the visualization framework 102 is to hide cognitively intensive information and provide a more summarized view of the user journey. The Abstract feature can be generally represented graphically in a GUI by a capsule containing three dots to denote past stages and can be placed at the beginning of the visualized flow. Abstraction can be incorporated at the following distinct levels:

state—Details about an individual state are abstracted and can contain a greater depth of information that can be attributed to a detailed description of that state, its significance, and whether the customer has previously encountered that state.

route—A segment of the journey that may not be contextually relevant, for instance, a route that has been explored but did not result in a successful completion, can be abstracted from view so that the customer can focus on the relevant route for successful query resolution.

journey—An entire journey can be abstracted, particularly in cases where an existing case is continued or when a closed case is reopened.

customer—A map-based global view can showcase overall insights about a larger group of customers instead of focusing on an individual journey.

The Expand component's role in the visualization framework 102 is to enable details-on-demand about various visual elements within the visualization framework 102. The Expand feature can be graphically represented in a GUI by a capsule containing three dots to denote past stages and can be placed at the beginning of the visualized flow. Expansion can be incorporated at the following distinct levels:

state—Detailed descriptions of a given state, its significance, and whether the customer has previously encountered that state can be showcased in addition to transcripts and notes associated with that state.

route—A route can be expanded to view the different states and associated constraints along a past or anticipated journey. A specific case of this expansion could be attributed to a deviant route.

journey—Additional context about an existing case or rationale behind a closed case can be expanded to provide a more comprehensive view of a journey.

The Filter component's role in the visualization framework 102 is to support the selective viewing of data points that align with the user's points of interest. The Filter feature can be generally represented in a GUI via set of multi-select boxes and can be demarked by a funneling icon. Users can narrow down on journeys based on the following filters:

mode—This can be utilized by a customer to filter journeys based on the mode or channel of communication.

agent id/name—Customers can filter a list of their journeys for those containing an interaction with a certain agent. Managers can view journeys that the agent was involved in across multiple customers.

customer id—Agents and managers can view journeys that are related to a specific customer or group of customers.

deviant state—Agents and managers can filter journeys that may contain deviant states to get a more focused understanding about where the challenges occur in the journeys.

constraint—Agents and managers can also choose to view journeys that contain a constraint of interest or journeys that contain no constraints.

domain—Managers can filter journeys for those related to a specific domain in scenarios where they are reviewing the overall performance across a domain demographics—Managers can also shortlist journeys that are linked to a specific demographic of interest—for instance, young adults versus aged adults.

state id—Managers and agents can choose to focus on journeys that contain a given state id or group of state ids.

drop off—Managers can choose to get more insights about specific states within a map that have more customers dropping off, where the drop off threshold can be used to draw additional focus to highly ambiguous states.

hand off—Managers can also choose to focus their view on states that experience frequent handoff between agents or modes, where the handoff threshold can be used to draw additional focus to states where resolution occurs less often than transfers or redirection.

The Search component's role in the visualization framework 102 is help find specific information within or about the user journey. The Search feature can be graphically represented in a GUI as a search icon with a text box. Searching can be centered around the following directions:

state id—Customers and agents can find a specific state identification or "id" in their current and past journeys.

time—Customers can also search for states and paths that they may have spent the most time on. Alternatively, a customer can search for states or paths that he or she was experiencing at a given time stamp.

constraint—Customers can also search for states that may have a constraint in order to obtain more context regarding whether the constraint was satisfied.

keyword—Customers, agents, and managers can delve deeper into a journey by searching for specific keywords that may be either outlined in the journey or can be linked to abstracted contexts regarding visual elements within the journey.

select—The Select feature's role in the visualization framework 102 is to support additional auxiliary features to enhance interactivity with the GUI. The visual features broadly covered within this component are:

tap—To view more details about a state or constraint, the user can "tap" on corresponding visual elements to view a more detailed panel with information.

hover—Visual elements can be highlighted when the mouse hovers over such visual elements, and their default states can be reactivated when the mouse is no longer placed on that visual element.

zoom—To support a closer focus on specific states or larger journeys within a map, the zoom "in and out" features can allow users to customize their view further.

prioritize—To enable users to perform bundled tasks by prioritizing and scheduling a set of states associated with each task. In such cases, two tangents exist—a horizontal tangent which refers to the sequence of completion (do A and then do B), and a vertical tangent that refers to the choice of choice of completion (do A, else do B).

The visualization system 100 can allow multiple desktop and mobile views to cater to different user roles. While agent and manager roles may predominantly have desktop views, customers may have both desktop and mobile views. This is to take into consideration the fact that some customers may be on the move during their interaction with customer care services. The journey can be rendered graphically and vertically in mobile devices to avoid horizontal scrolling and can be rendered graphically and horizontally in a desktop mode. The journey overflow can be captured by the Abstract/Expand option for both mobile and desktop views.

The mapping module 107 can contain a set of instructions, steps or operations to identify contextual insights and map them to their associated visual elements. There are four core element mapping methods:

State Mapping—In this method, the type of state is determined and mapped to its corresponding visual markers.

Path Mapping—In this method, the type of path is determined and mapped to its corresponding visual markers.

Temporal Mapping—In this method, the time or timestamp associated with a visual element is determined and mapped as text placed adjacent to the corresponding visual markers.

Deviance Mapping—This method caters specifically to the identification of deviant states and routes and subsequent mapping to corresponding visual markers.

State Mapping

For every state in the customer journey, the visualization framework 102 can identify the state's type and can then triggers changes to the visual element. The algorithm for the same can be as follows:

1. For each state $S_i$:
   1.1 If the customer is currently in this state in the current journey, then
      1.1.1 Classify as current state.
      1.1.2 If this state refers to a hold, then
         1.1.2.1 Retrieve list of nested states associated with hold [$S_{k1}$, $S_{k2}$, $S_{k3}$ etc].
         1.1.2.2 For each state in nested state, assign indent as 1
         1.1.2.3 Set $S_i$'s indent to 0.
         1.1.2.4 Map the hold icon to current state
      1.1.3 If the previous state $S_{i-1}$'s indent = 1, then
         1.1.3.1 Retrieve $S_i$'s preceding hold state $S_h$.
         1.1.3.2 If Si is in list of nested states associated with $S_h$ [$S_{k1}$, $S_{k2}$, $S_{k3}$ etc],
            1.1.3.2.1 Set $S_i$'s indent to 1.
            1.1.3.2.2 Map $S_i$ with a branched current state icon
      1.1.4 Else,
         1.1.4.1 Set $S_i$'s indent to 0.
         1.1.4.2 Map $S_i$ with the regular current state icon.
      1.1.5 Render the current state at corresponding indent to all views.
   1.2 Else if the customer has not yet visited this state in the current journey, then
      1.2.1 Classify as potential state.

1.2.2 If this customer has visited this state in his previous
journeys, then
    1.2.2.1 If states adjacent to this state have not been
as frequently visited as this state, then
        1.2.2.1.1 Sub-classify this state as
probable state.
1.2.3 If the previous state $S_{i-1}$'s indent = 1, then
    1.2.3.1 Retrieve $S_i$'s preceding hold state $S_h$.
    1.2.3.2 If Si is in list of nested states associated with
$S_h$ [$S_{k1}$, $S_{k2}$, $S_{k3}$ etc],
        1.2.3.2.1 Set $S_i$'s indent to 1.
        1.2.3.2.2 Map $S_i$ with a branched potential
state icon at indent.
1.2.4 Else,
    1.2.4.1 Set Si's indent to 0.
    1.2.4.2 Map $S_i$ with the regular potential state icon
at indent.
1.2.5 Render potential state at corresponding indent to
customer view
1.2.6 Render probable state, if any, at corresponding indent to
agent and manager views.
1.3 Else if the customer has already visited this state in the
current journey, then
    1.3.1 Classify as past state.
    1.3.2 If this state refers to a hold, then
        1.3.2.1 Retrieve list of nested states associated
with hold [$S_{k1}$, $S_{k2}$, $S_{k3}$ etc].
        1.3.2.2 For each state in nested state, assign
indent as 1
        1.3.2.3 Set Si's indent to 0.
        1.3.2.4 Map the hold icon adjacent to the past
state.
    1.3.3 If the previous state $S_{i-1}$'s indent = 1, then
        1.3.3.1 Retrieve $S_i$'s preceding hold state $S_h$.
        1.3.3.2 If $S_i$ is in list of nested states associated with
$S_h$ [$S_{k1}$, $S_{k2}$, $S_{k3}$ etc],
            1.3.3.2.1 Set $S_i$'s indent to 1.
            1.3.3.2.2 Map $S_i$ with a branched past state
icon
    1.3.4 Else,
        1.3.4.1 Set $S_i$'s indent to 0.
        1.3.4.2 Map $S_i$ with the regular past state icon at
indent.
    1.3.5 Render the past state at corresponding indent to all
views.
1.4 Invoke the time mapping function by passing state Si as a parameter.
1.5 Invoke the path mapping function by passing a pair of states <$S_i$, $S_{i-1}$>.

Path Mapping

For every two consecutive states in the customer journey, the visualization framework 102 can identify the type of path and can then trigger changes to the visual element. The algorithm for the same can be as follows:

2. For each state pair <$S_i$, $S_j$>:
    2.1 If the states are not adjacent to each other, i.e., j!= i-1,
        2.1.1 Classify path $P_i$ as null path
        2.1.2 Do not render the null path
    2.2 Else if the customer is currently at state $S_i$ in the current journey
i.e.,
$S_i$ is a current state, then
        2.2.1 Classify path $P_i$ as past path.
        2.2.2 If $S_i$'s indent = $S_j$'s indent,
            2.2.2.1 Render past path $P_i$ as solid black line
connecting $S_i$ and $S_j$.
        2.2.3 Else,
            2.2.3.1 Render past path $P_i$ as a branched solid
black line connecting $S_i$ and $S_j$ at indent.
    2.3 Else if the customer has not yet visited this state in the current
journey, i.e., $S_i$ is a potential state, then
        2.3.1 Classify path $P_i$ as potential path.
        2.3.2 If $S_i$ is a probable state, then
            2.3.2.1 Map probable path to $P_i^*$.
        2.3.3 If $S_i$'s indent = $S_j$'s indent,
            2.3.3.1 Render potential path $P_i$ as solid black line
connecting $S_i$ and $S_j$ in all views.
        2.3.4 Else,
            2.3.4.1 Render potential path $P_i$ as a branched solid
black line connecting Si and Si at indent in all
views.
        2.3.5 Replace potential path Pi with probable path Pi* at indent,
if any, and render to agent and manager views.
    2.4 Invoke the time mapping function by passing path Pi as a
parameter.

Temporal Mapping

In addition to identifying states and paths, the ViserAct framework can also render various temporal elements. An algorithm that can be implemented for estimating and rendering these elements can be as follows:

3. For each parameter passed to the function:
    3.1 If parameter is a new journey Ji, then
        3.1.1 Assign current timestamp to request creation time.
        3.1.2 Initiate the elapsed customer time variable with 0.
        3.1.3 Initiate the estimated resolution time with the exponential
recency weighted average of elapsed customer time
across all customers.
        3.1.4 Render request creation time and elapsed customer time
on screen.
    3.2 Else if parameter is a state Si, then
        3.2.1 If Si is a current state, then
            3.2.1.1 Assign current timestamp to state begin
time.
            3.2.1.2 Initiate the elapsed state time variable.
            3.2.1.3 If the state Si is associated with an agent Ai,
then
                3.2.1.3.1 Initiate the elapsed agent time variable.
        3.2.2 If Si has been visited by the current customer, then
            3.2.2.1 Retrieve list of records when state Si was
visited by the current customer [R=, $R_2$, . . . , $R_k$]
            3.2.2.2 Calculate the exponential recency weighted
average of the elapsed state time(xi) across all
records R as:
$\square = \Sigma_{\square-1}^{\square} \square_\square \square_\square$, where $\square_\square = \square(1 - \square)^{\square-\square}$ and $\alpha \square [0, 1]$
        3.2.3 Else, $\square = 0$
        3.2.4 If $S_i$ has been visited by other customers, then
            3.2.4.1 Retrieve list of records when state Si was
visited by all customers [$R_1$, $R_2$, . . . , $R_k$]
            3.2.4.2 Calculate the exponential recency weighted
average of the elapsed state time(xi) across all
records R as:
$\square_{\square\square\square\square\square\square\square} = \Sigma_{\square-1}^{\square} \square_\square \square_\square$, where $\square_\square = \square(1 - \square)^{\square-\square}$ and $\alpha \square [0, 1]$
        3.2.5 Else, $\square_{\square\square\square\square\square\square\square} = 0$
        3.2.6 Assign the max ($\square$, $\square_{\square\square\square\square\square\square\square}$) as the estimated state time.
        3.2.7 Revise the estimated resolution time by deducting the
estimated state time from it.
        3.2.8 Render state begin time, estimated state time, and
elapsed state time on screen.
        3.2.9 Render elapsed agent time on the agent and manager
views.

Deviance Mapping

The visualization framework 102 can also identify and visualize deviant states and routes. The algorithm for the same can be as follows:

4. For each state $S_i$:
    4.1 Retrieve set of journey records R associated with all customer
encounters with state $S_i$.
    4.2 For each journey record $R_i$:
        4.2.1 Calculate the total number of times each unique state $S_k$
was visited as $n_{ik}$.
        4.2.2 Average total visits across all records (p) for each state $S_k$
as:

-continued $$\Box_\Box = \frac{1}{\Box} * \sum_{\Box=1}^{\Box} \Box_{\Box\Box}$$

4.2.3 Calculate □ as the average number of repeated visits across states 1 to n, i.

$$\Box = \frac{1}{\Box} * \sum_{\Box=1}^{\Box} \Box_\Box$$

4.3 Retrieve the user's current and predicted journey $J_i$ from the Prediction Engine.
4.4 If Si is a current or past state and is not $J_i$,
   4.4.1 Update Prediction Engine with $S_i$
   4.4.2 Retrieve revised predicted journey and update $J_i$.
4.5 If Si is in the predicted journey $J_i$, then
   4.5.1 If previous state $S_{i-1}$ is a deviant state, then
     4.5.1.1 Classify $S_i$ as a deviant state
     4.5.1.2 Assign $S_i$'s deviance root = 0
   4.5.2 Else if $N_k > \Box$
     4.5.2.1 Classify $S_i$ as a deviant state with deviance root = 1
     4.5.2.2 Add $S_i$ to the deviant route $S^*$
     4.5.2.3 Add list of succeeding states from $S_i$, i.e., $[S_{i+1}, S_{i+2}, ...]$ in journey $J_i$ to deviance route $S^*$
     4.5.2.4 For each state $S_j$ in $S^*$:
       4.5.2.4.1 Call the deviance mapping function with parameter $S_j$
4.6 Render the deviant route $S^*$.

Figure 5:
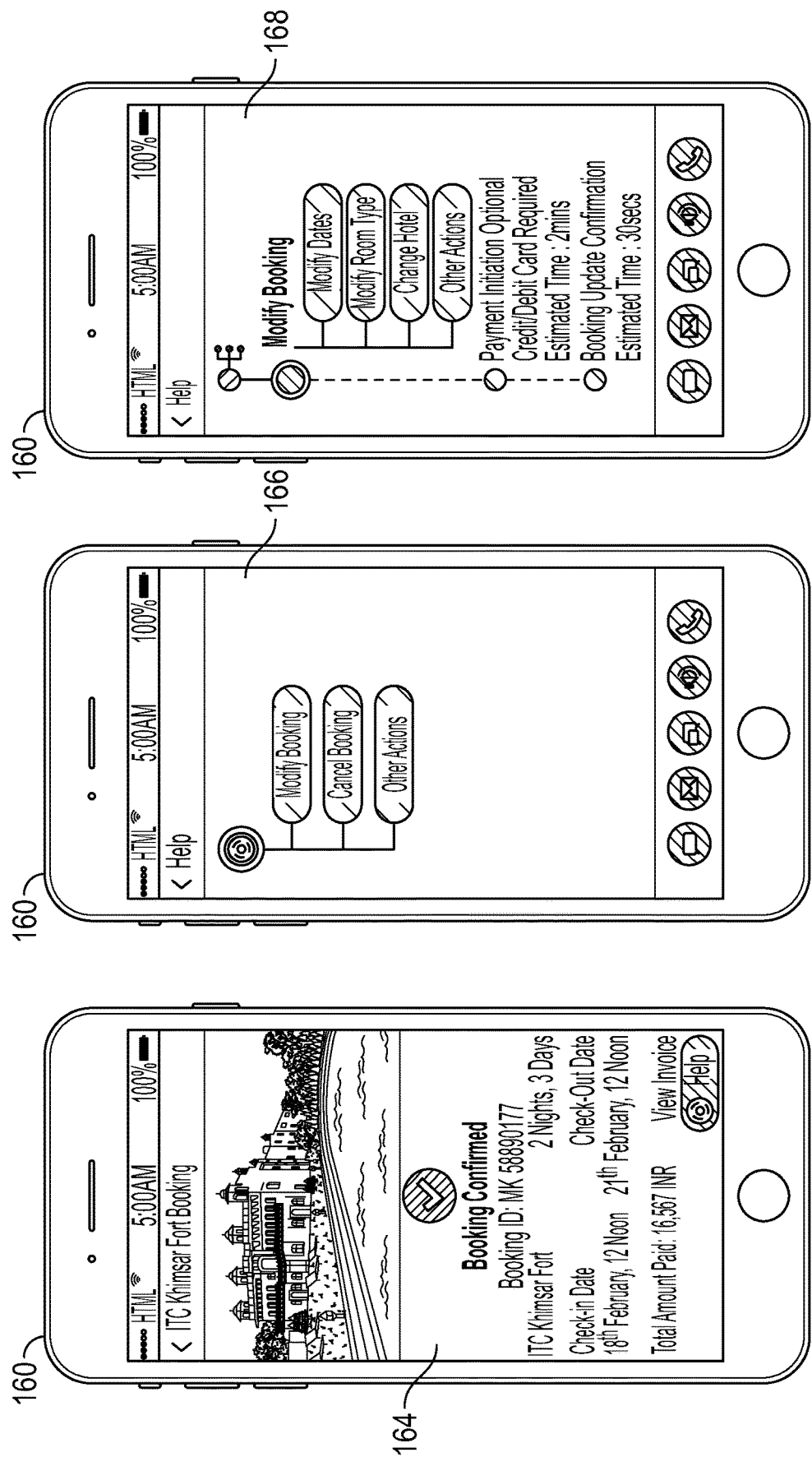
FIG. 5-6 illustrates a mobile computing device with different graphical user interfaces in accordance with the disclosed embodiments.
Figure 6:
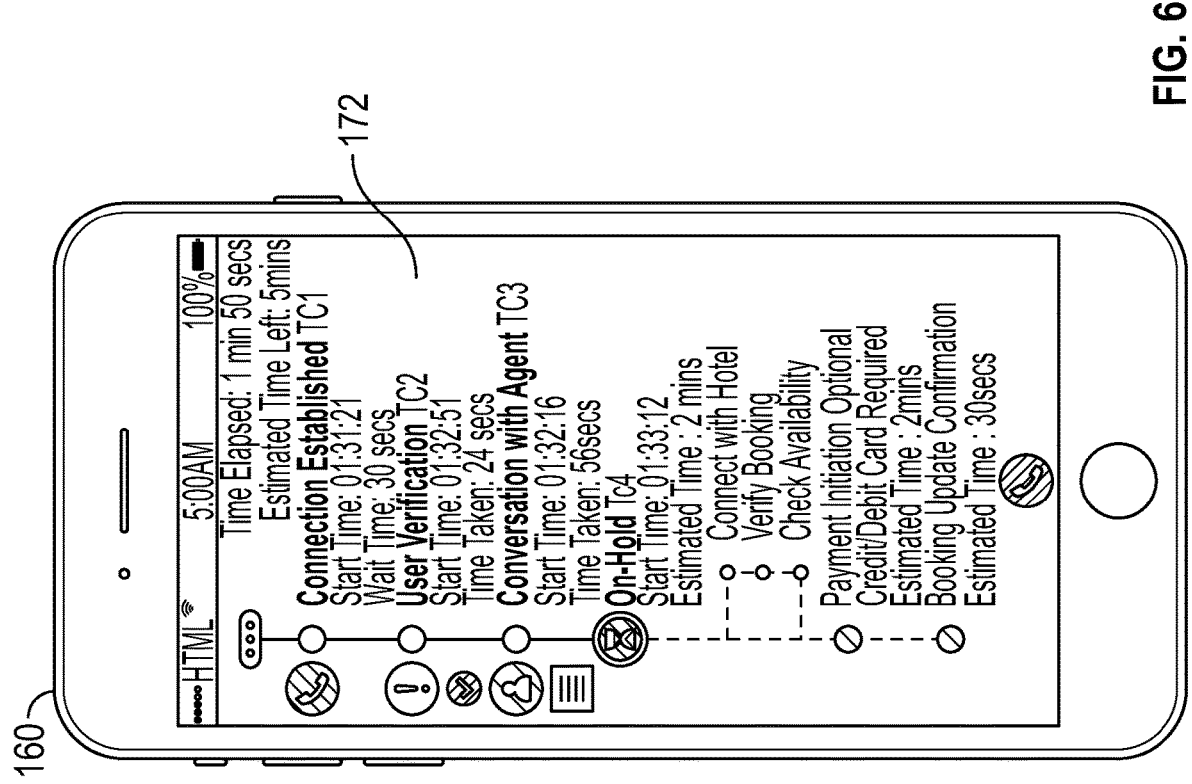
Figure 6:
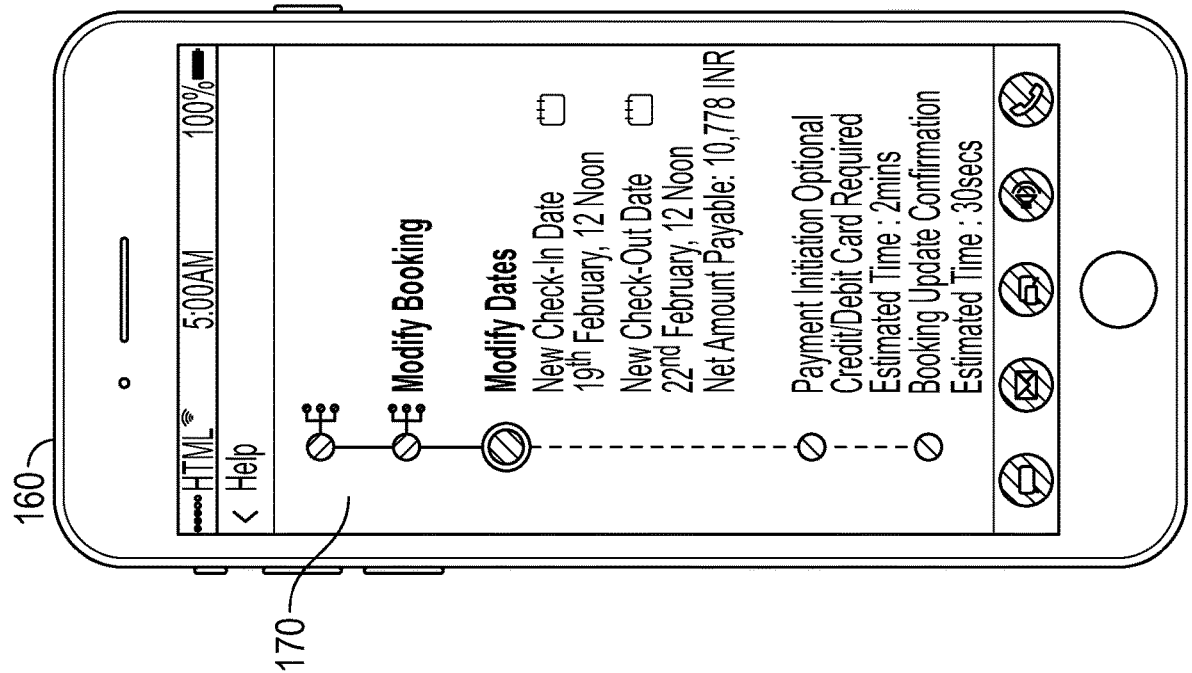

FIG. 5-6 illustrates a mobile computing device 160 with different graphical user interface screens in accordance with the disclosed embodiments. As shown in FIG. 5, three different GUI screens are depicted. First, a GUI screen 164 is indicated, which can be configured to display information and graphics confirming that a particular hotel booking has been confirmed. The GUI screen 166, however, can display options that when selected by a user may allow the user to modify the booking, cancel the booking or implement other activities. The GUI screen 168 can be further configured to graphically display options for modifying a booking such as modifying a room type, booking dates, and so on.

FIG. 6 shows a GUI screen 170 and a GUI screen 172. The GUI screen 170 can be configured to display further options for modifying the booking including modifying the booking dates. As can be shown in FIG. 6 a path is beginning to be displayed. The GUI screen 172 shows a more detailed path from the time a connection was established to user verification, conversation with an agent, and "on hold" status and information. It can be assumed that the information displayed in the various screens of the device 160 can be displayed for a customer.

Figure 7:
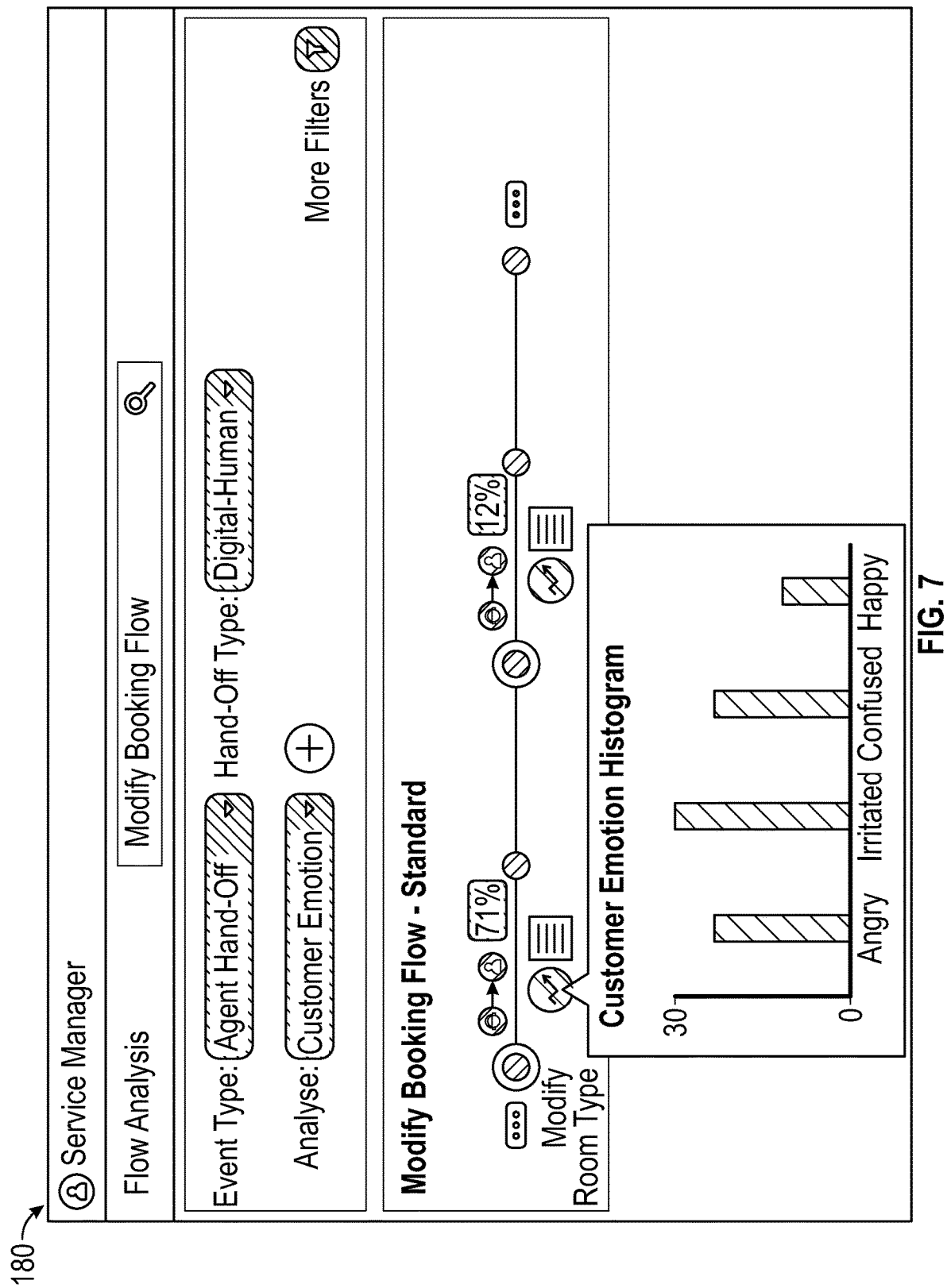
FIGS. 7-9 illustrate a graphical user interfaces in accordance with the disclosed embodiments.
Figure 8:
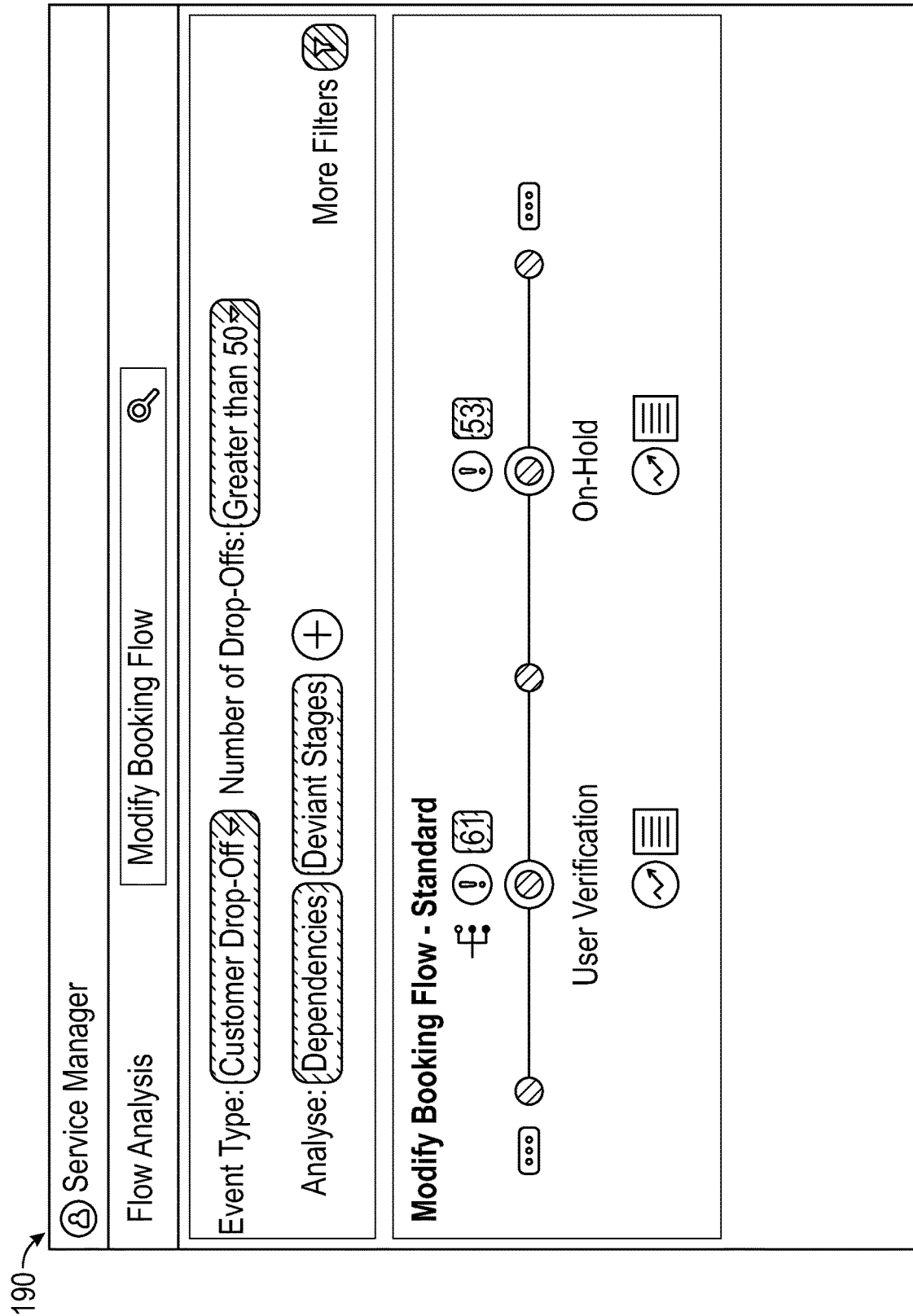
Figure 9:
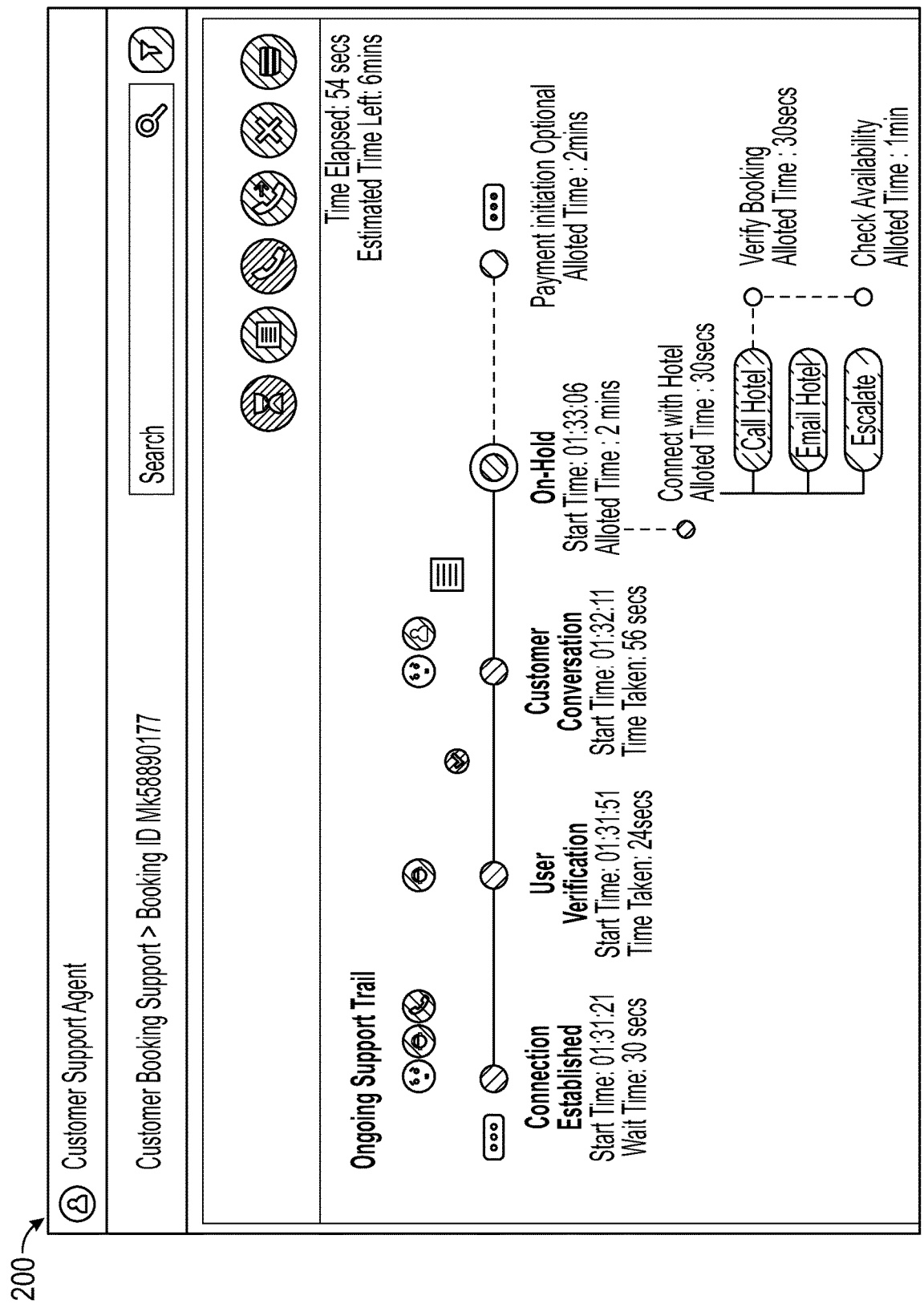

FIG. 7-9, on the other hand, illustrate graphical user interfaces in accordance with the disclosed embodiments, which can be provided for a manager or agent. For example, the GUI 180 shown in FIG. 7 can be configured to display for a service manager, the event type, hand-off type, modifying booking flow information including a customer emotion histogram. GUI 190 shown in FIG. 8 can also be provided for the service manager, and can be configured to display information about the path including the journey that the customer has followed including activity such as user verification and the "on-hold" status. The GUI 200 shown in FIG. 9 can be provided for a customer support agent and can be configured to display the ongoing support trail or path, which can track the connection established, user verification, customer conversation, the on-hold status and other activities and information such as payment initiation.

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of GUI features may be considered a special-purpose computer designed with the specific purpose of rendering a visualization. In general, embodiments may be implemented as a method, and/or a computer program product at any possible technical detail level of integration. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 10:
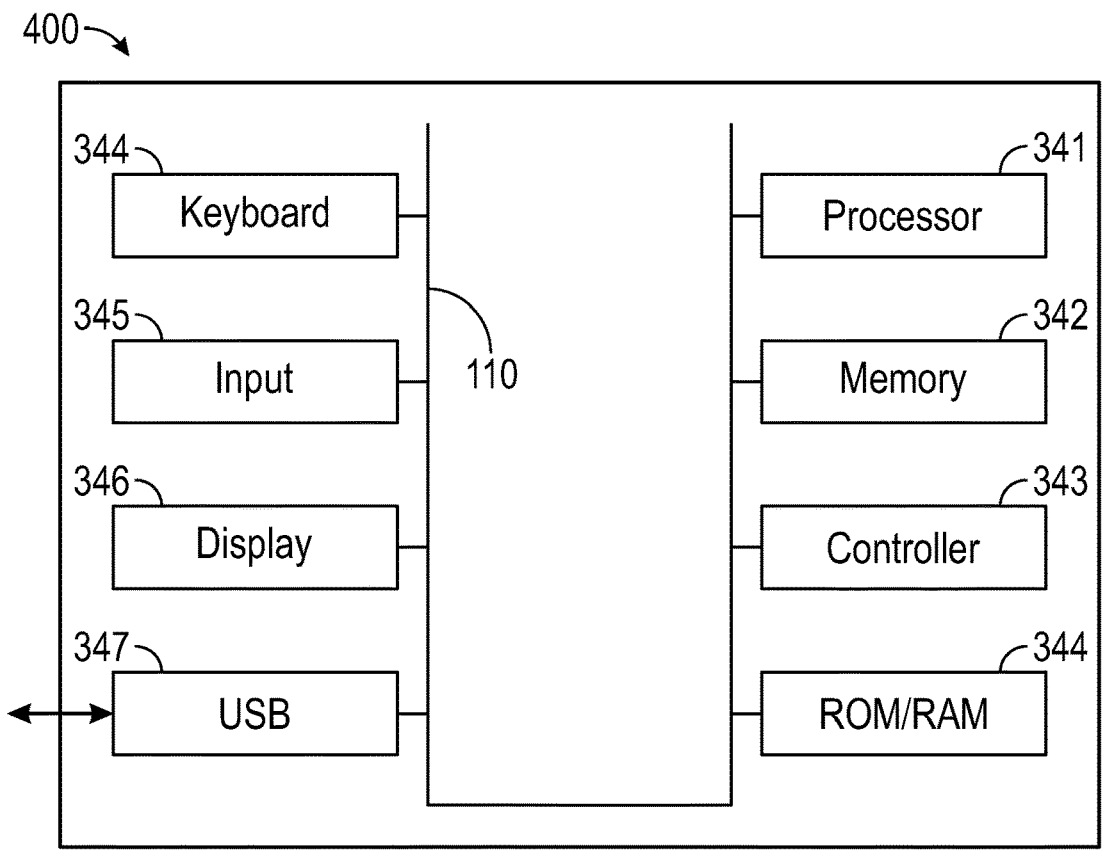
FIG. 10 illustrates a schematic view of a computer system, in accordance with an embodiment.
Figure 11:
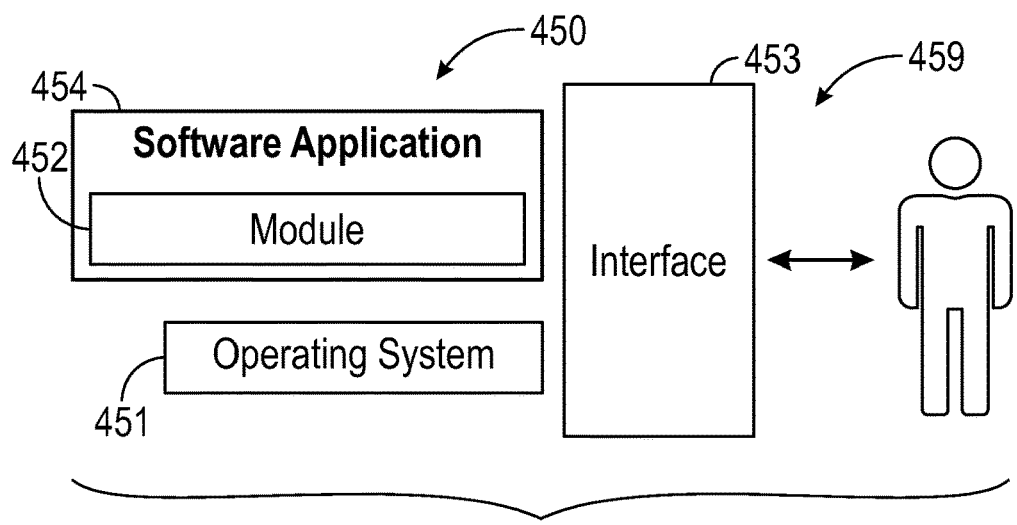
FIG. 11 illustrates a schematic view of a software system including a module, an operating system, and a user interface, in accordance with an embodiment.

FIGS. 10-11 are shown only as exemplary diagrams of data-processing environments in which example embodiments may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Such a CPU, alone or in conjunction with one or more of the other elements disclosed in FIGS. 1-2 and/or FIGS. 15-16, is an example of a production device, computing device or processor. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 11 illustrates a computer software system 450 for directing the operation of the data-processing system 400 depicted in FIG. 10. The software application 454, stored for example in memory 342 and/or another memory, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions or operations such as those discussed herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module (or an engine) as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. Examples of modules include the various components discussed previously herein, such as the prediction engine 116, the MLP engine 114, the ASR engine 106, and the TTS engine 108. The visualization framework 102 may also be implemented as a module and discussed previously here can be composed of a group of modules including the core module 103, the interactivity module 105, and the mapping module 107. It should be appreciated that implementation and processing of such modules according to the approach described herein can lead to improvements in processing speed and ultimately in energy savings and efficiencies in a data-processing system such as, for example, the data-processing system 400 shown in FIG. 15. A "module" can perform the various steps, operations or instructions discussed herein.

Note that the visualization framework 102 and the various modules such as the NLP engine 114, prediction engine 116, and so on, for example, can constitute an improvement to a computer system (e.g., such as the data-processing system 400 shown in FIG. 10) rather than simply the use of the computer system as a tool. The visualization framework 102 along with the other modules, instructions and functionalities discussed herein can result in a specific improvement over prior systems, resulting in an improved user interface for electronic devices including data-processing systems. Such an improved user interface can facilitates a dynamic visualization of information for users, in a manner not available in prior visualization mechanisms.

FIGS. 10-11 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. The ability to provide a visualization of a customer's or an agent's journey and interactions in a fast and efficient manner can lead to improved efficiencies such as in memory management and processing in the underlying computer technology. The visualization framework disclosed herein provides the benefits of a more seamless GUI implementation along with faster searching of databases and more efficient data storage. Such improvements can result from implementations of the disclosed embodiments. The claimed solution may be rooted in computer technology in order to overcome a problem specifically arising in the realm of computers, computer networks and call center platforms.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for dynamically visualizing a user experience, comprising:
   tracking data indicative of an interaction and a journey taken by a customer and an agent through a mapping that identifies contextual insights and maps the contextual insights to associated visual elements including varying graphically displayable objects that when activated by a user performs at least one function, wherein the graphically displayable objects include emotion elements and the mapping comprises state mapping, path mapping, temporal mapping and deviance mapping, the path mapping including a past path, a potential path and a probable path, wherein the past path comprises a path associated with states that have already been traversed by the customer, wherein the potential path comprises a path associated with any potential state with respect to the customer, and wherein the probable path comprises a path associated with a state that has been predicted with a higher level of confidence than the potential path;
   selectively rendering a visualization of the interaction and the journey taken by the customer and the agent to aid in a faster resolution of an issue experienced by the customer, wherein the visualization comprises the associated visual elements including the varying graphically displayable objects;
   displaying in a local view as a part of the visualization, the varying graphically displayable objects in association with content generated by natural language processing of data obtained from a chat feature, the content indicative of an interpretation of an inquiry by the customer to the agent through the chat feature during the journey between the customer and the agent; and
   providing the agent with an option to select and display a global view of various customer journeys through a domain of expertise associated with the agent.

2. The method of claim 1 further comprising identifying deviant states and routes within the data indicative of interactions and journeys taken by the customer and the agent, wherein the deviant states are identified through the deviance mapping by assigning a deviance root and classifying at least one deviant state among the deviant states with the deviance root.

3. The method of claim 1 granularizing the data indicative of the interactions taken by the customer and the agent to provide historical and real-time insights from the data, which are then selectively rendered for at least one of the customer, the agent and a manager of the agent as a part of the visualization.

4. The method of claim 1 further comprising granularizing the data indicative of the interactions taken by the customer and the agent to identify deviant states and routes from the data, which are then selectively rendered for at least one of the agent and a manager of the agent as a part of the visualization.

5. The method of claim 2 further comprising personalizing the visualization based on a user role.

6. The method of claim 2 further comprising personalizing the visualization based on a type of device by which the visualization is rendered.

7. The method of claim 2 further comprising:
personalizing the visualization based on a type of display in which the visualization is rendered; and
wherein the emotions elements comprise a customer emotion histogram.

8. The method of claim 1 further comprising:
providing an interactivity feature that facilitates searching and filtering of the data indicative of the interaction and the journey taken by the customer and the agent; and
displaying the visualization based on results of the searching and the filtering of the data.

9. A system for dynamically visualizing a user experience, comprising:
at least one processor and a memory, the memory storing instructions to cause the at least one processor to perform:
tracking data indicative of an interaction and a journey taken by a customer and an agent through a mapping that identifies contextual insights and maps the contextual insights to associated visual elements including varying graphically displayable objects that when activated by a user performs at least one function, wherein the graphically displayable objects include emotion elements and the mapping comprises state mapping, path mapping, temporal mapping and deviance mapping, the path mapping including a past path, a potential path and a probable path, wherein the past path comprises a path associated with states that have already been traversed by the customer, wherein the potential path comprises a path associated with any potential state with respect to the customer, and wherein the probable path comprises a path associated with a state that has been predicted with a higher level of confidence than the potential path; and
selectively rendering a visualization of the interaction and the journey taken by the customer and the agent to aid in a faster resolution of an issue experienced by the customer, wherein the visualization comprises the associated visual elements including the varying graphically displayable objects;
displaying in a local view as a part of the visualization, the varying graphically displayable objects in association with content generated by natural language processing of data obtained from a chat feature, the content indicative of an interpretation of an inquiry by the customer to the agent through the chat feature during the journey between the customer and the agent; and
providing the agent with an option to select and display a global view of various customer journeys through a domain of expertise associated with the agent.

10. The system of claim 9 wherein the instructions are further configured for identifying deviant states and routes within the data indicative of interactions and journeys taken by the customer and the agent, wherein the deviant states are identified through the deviance mapping by assigning a deviance root and classifying at least one deviant state among the deviant states with the deviance root.

11. The system of claim 9 wherein the instructions are further configured for granularizing the data indicative of the interactions taken by the customer and the agent to provide historical and real-time insights from the data, which are then selectively rendered for at least one of the customer, the agent, and a manager of the agent as a part of the visualization.

12. The system of claim 9 wherein the instructions are further configured for granularizing the data indicative of the interactions taken by the customer and the agent to identify deviant states and routes from the data, which are then selectively rendered for at least one of the agent and a manager of the agent as a part of the visualization.

13. The system of claim 10 wherein the instructions are further configured for personalizing the visualization based on a user role.

14. The system of claim 10 wherein the instructions are further configured for personalizing the visualization based on a type of device by which the visualization is rendered.

15. The system of claim 10 wherein the instructions are further configured for personalizing the visualization based on a type of display in which the visualization is rendered, wherein the emotions elements comprise a customer emotion histogram.

16. The system of claim 9 wherein the instructions are further configured for:
providing an interactivity feature that facilitates searching and filtering of the data indicative of the interaction and the journey taken by the customer and the agent; and
displaying the visualization based on results of the searching and the filtering of the data.

* * * * *